United States Patent
Kokuta (10) Patent No.: US 11,897,257 B2
(45) Date of Patent: Feb. 13, 2024

(54) PRINTER FOR PRINTING ON A PRINTING MEDIUM HAVING A RADIO FREQUENCY IDENTIFICATION (RFID)

(71) Applicant: SATO HOLDINGS KABUSHIKI KAISHA, Tokyo (JP)

(72) Inventor: Hiroshi Kokuta, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 158 days.

(21) Appl. No.: 17/611,264

(22) PCT Filed: Jun. 24, 2020

(86) PCT No.: PCT/JP2020/024875
§ 371 (c)(1),
(2) Date: Nov. 15, 2021

(87) PCT Pub. No.: WO2020/262479
PCT Pub. Date: Dec. 30, 2020

(65) Prior Publication Data
US 2022/0227148 A1 Jul. 21, 2022

(30) Foreign Application Priority Data
Jun. 28, 2019 (JP) .................................. 2019-121975
Jun. 19, 2020 (JP) .................................. 2020-106334

(51) Int. Cl.
*G06K 7/10* (2006.01)
*B41J 11/00* (2006.01)
*B41J 35/00* (2006.01)

(52) U.S. Cl.
CPC ........... *B41J 11/0095* (2013.01); *B41J 35/00* (2013.01); *G06K 7/10297* (2013.01)

(58) Field of Classification Search
CPC .... G06K 19/00; G06K 19/025; B41J 11/0095
USPC .................................................. 358/1.18, 1.1
See application file for complete search history.

(56) References Cited

U.S. PATENT DOCUMENTS

2002/0170973 A1* 11/2002 Teraura .............. G06K 19/0723
235/492
2011/0096117 A1* 4/2011 Burke .................... B41J 29/393
347/16

FOREIGN PATENT DOCUMENTS

| JP | 2000-233847 A | 8/2000 |
| JP | 2001-331768 A | 11/2001 |
| JP | 2007-50541 A | 3/2007 |
| JP | 6403966 B2 | 10/2018 |

* cited by examiner

*Primary Examiner* — Jamares Q Washington
(74) *Attorney, Agent, or Firm* — Foley & Lardner LLP (57) ABSTRACT

This printer performs printing on a print medium having an RFID, and comprises: a communication unit which has a communication part movably provided in a predetermined area along the transport surface of the print medium, and communicates with an IC chip of the RFID; and a detection unit which detects the print medium by means of detection light. The detection unit includes: a light emitting part that emits detection light; a light guide member that guides the detection light emitted from the light emitting part to the print medium; and a light receiving part that receives the detection light via the print medium.

12 Claims, 6 Drawing Sheets

PRINTER FOR PRINTING ON A PRINTING MEDIUM HAVING A RADIO FREQUENCY IDENTIFICATION (RFID)

TECHNICAL FIELD

The present invention relates to a printer.

BACKGROUND ART

JP6403966B discloses a printer that performs printing on a label attached temporally to one surface of a label continuous body, and has a transmissive sensor provided on an upstream side of a printing unit. The transmissive sensor includes a light emitting element that emits detection light for detecting the label, and a light receiving element that is arranged to face the light emitting element with the label interposed in between and receives the detection light.

In the printer described above, the transmissive sensor is configured to be a sensor unit having the light emitting element and the light receiving element respectively provided to an upper sensor attachment holder and a lower sensor attachment holder. The sensor unit is arranged to make the label continuous body inserted between the upper sensor attachment holder and the lower sensor attachment holder.

With this configuration, the label can be detected when the label continuous body conveyed passes between the upper sensor attachment holder and the lower sensor attachment holder.

SUMMARY OF INVENTION

The printer as described above may be provided with a communication unit for communicating with Radio Frequency Identification (RFID), so that a printing medium having an RFID can be used.

In this context, the communication unit has been demanded to have the position adjustable so that an excellent communication state can be maintained in accordance with various shapes and sizes of the printing medium as well as the position of an IC chip which varies depending on the arrangement of the RFID.

The printer disclosed in JP6403966B, however, has a substrate, on which the light emitting element or the light receiving element are formed, provided to the upper sensor attachment holder and the lower sensor attachment holder, meaning that the sensor unit is structured to be thick on the back surface side of the surface facing the label continuous body. Thus, there has been a problem in that a desirable movable area of the communication unit is difficult to secure.

In view of this, an object of the present invention is to enable the movable area of the communication unit to be secured, without hindering communications.

According to an aspect of the present invention, a printer is provided that is configured to perform printing on a printing medium having an RFID, and includes: a communication unit that includes a communicator provided to be movable in a predetermined area along a conveyance surface of the printing medium, and is configured to communicate with an IC chip of the RFID; and a detection unit configured to detect the printing medium using detection light, wherein the detection unit includes: a light emitter configured to emit the detection light; a light guiding member configured to guide the detection light, emitted from the light emitter, to the printing medium; and a light receiver configured to receive the detection light through the printing medium.

According to an aspect of the present invention, the light guiding member configured to guide the detection light, emitted from the light emitter, to the printing medium is provided. With this configuration, the light emitter can be arranged with a higher degree of freedom, and thus can be arranged at a position not hindering the movement of the communication unit. Thus, the movable area of the communication unit can be secured without hindering the communications.

DESCRIPTION OF EMBODIMENTS

First Embodiment

Figure 1:
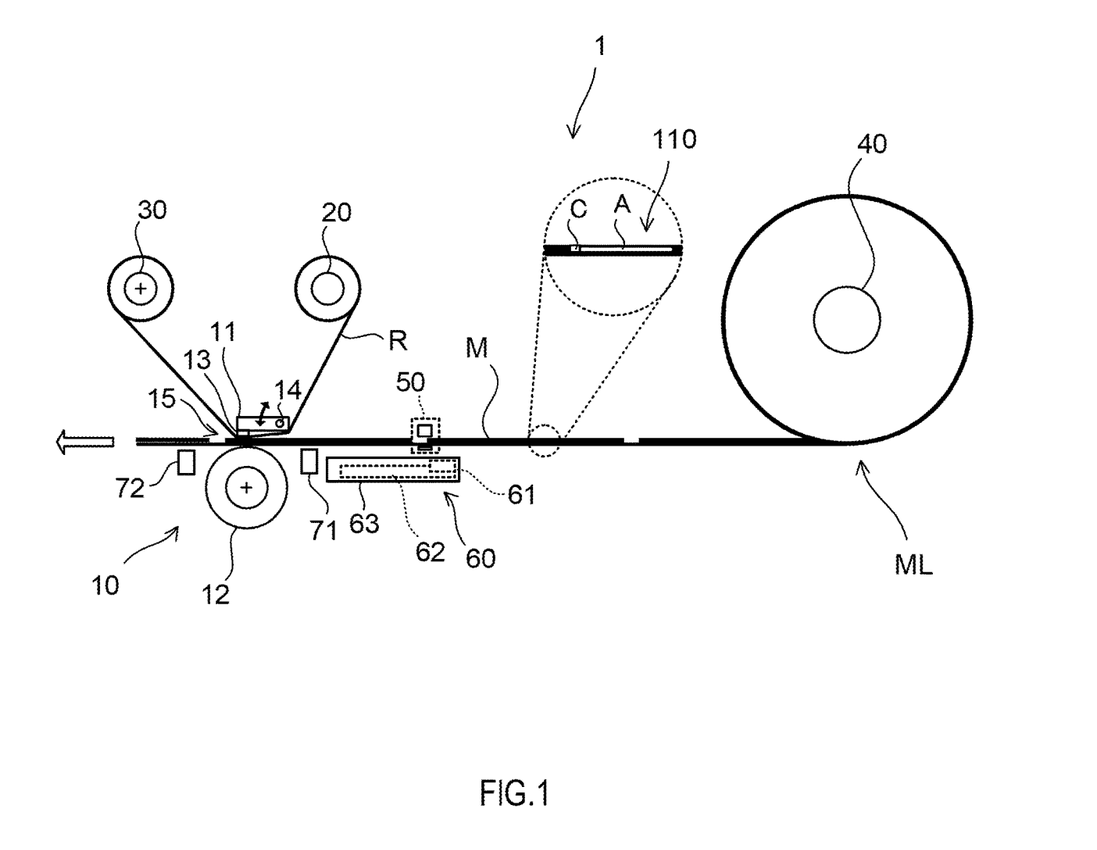
FIG. 1 is a schematic view illustrating a configuration of a printer according to a first embodiment of the present invention.

A printer 1 according to a first embodiment of the present invention will be described in detail with reference to the attached drawings. FIG. 1 is a schematic view illustrating a configuration of the printer 1 according to the first embodiment of the present invention.

The printer 1 is of a thermal transfer type, and performs printing by transferring ink on an ink ribbon R onto a printing medium M by heating the ink ribbon R. The printing medium M is formed as a continuous body ML that has a strip shaped mount on which a plurality of labels are sequentially and detachably attached at a predetermined pitch and is rolled into a roll shape, for example.

The printing medium M incorporates a Radio Frequency Identification (RFID) 110. Note that the printer 1 can also perform printing on a printing medium not having the RFID 110. This RFID is an RFID inlet including an IC chip C and an antenna A.

The printer 1 prints, on a printing region of the printing medium M, variable information such as product information such as a price, a barcode, and management information on items and services as appropriate, and also writes information corresponding to the variable information to the IC chip C of the RFID 110 as electronic data.

As illustrated in FIG. 1, the printer 1 includes, for example, a printing mechanism 10, a ribbon supply shaft 20, a ribbon winding shaft 30, a medium supply shaft 40, a detection unit 50 for detecting the printing medium M, and a communication unit 60 that communicates with the IC chip C of the RFID 110. The printing medium M is printed and conveyed in the printer 1, under the control of an unillustrated controller.

The printing mechanism 10 includes a head unit 11 and a platen roller 12, and performs printing on the printing medium M and conveyance of the continuous body ML and the ink ribbon R.

The thermal head 13 is held by the head unit 11 while having a heating element exposed on the lower surface. The platen roller 12 is disposed immediately below the thermal head 13, and forms, with the thermal head 13, the printing unit 15 that performs printing on the printing medium M.

The head unit 11 is supported by the supporting shaft 14 to be slidable in a direction indicated by an arrow in FIG. 1. The head unit 11 can be moved between a head open position at which the thermal head 13 is separated from the platen roller 12, and a head close position at which the thermal head 13 is in contact with the platen roller 12. In FIG. 1, the head unit 11 is at the head close position.

The ribbon supply shaft 20 holds the ink ribbon R, supplied to the printing unit 15, in a roll shape. The ink ribbon R supplied from the ribbon supply shaft 20 to the printing unit 15 is clamped between the thermal head 13 and the platen roller 12.

The medium supply shaft 40 holds the continuous body ML, supplied to the printing unit 15, in a roll shape. The continuous body ML supplied from the medium supply shaft 40 to the printing unit 15 is clamped between the thermal head 13 and the platen roller 12 together with the ink ribbon R.

When the heating emitting element of the thermal head 13 is supplied with power in the state where the printing medium M and the ink ribbon R are clamped between thermal head 13 and the platen roller 12, the heat of the heating element causes transfer of the ink on the ink ribbon R onto the printing medium M, and thus printing on the printing medium M is performed. When a platen drive motor (not illustrated) makes the platen roller 12 rotate in the positive direction, the continuous body ML and the ink ribbon R are conveyed toward the downstream side.

The ink ribbon R after the use is wound on the outer circumference of the ribbon winding shaft 30 rotating due to the gear coupling with the platen drive motor. When the head unit 11 is at the head open position, only the ink ribbon R can be fed by rotating the ribbon winding shaft 30.

The detection unit 50 is a sensor that detects the position of the printing medium M in the continuous body ML, and detects a gap between the printing medium M and the printing medium M in the continuous body ML and the like in the present embodiment. The printer 1 can detect a relative position of the printing medium M with respect to the printing unit 15, based on the gap between the printing media M detected by the detection unit 50.

The communication unit 60 includes a communicator 61 and a moving mechanism 62. The communicator 61 includes an antenna that transmits a signal to the IC chip C of the RFID 110 and receives a response to the signal. The moving mechanism 62 is a mechanism that makes the communicator 61 movable in a predetermined area (hereinafter, referred to as an area S) along the conveyance surface of the printing medium M. The communicator 61 and the moving mechanism 62 are covered by a cover 63. The detection unit 50 and the communication unit 60 will be described in detail later.

The printer 1 further includes an upstream side position detection sensor 71 and a downstream side position detection sensor 72 for detecting the printing medium M.

The continuous body ML has eye marks for position detection, provided at a predetermined pitch corresponding to the printing medium M. The upstream side position detection sensor 71 detects the eye marks. The printer 1 can detect the relative position of the printing medium M with respect to the printing unit 15, with the upstream side position detection sensor 71 detecting the eye marks. In present embodiment, a reflective photoelectric sensor is used as the upstream side position detection sensor 71.

The downstream side position detection sensor 72 is a sensor for detecting a leading edge position of the continuous body ML.

In the present embodiment, a transmissive photo electric sensor is used as the downstream side position detection sensor 72.

Relative positions of the upstream side position detection sensor 71 and the downstream side position detection sensor 72 with respect to the position of the printing unit 15 are predetermined. The position of the printing unit 15 is a position where the thermal head 13 performs printing on the printing medium M, and a position where the platen roller 12 and the thermal head 13 clamp the continuous body ML. With this configuration, the printer 1 can detect the relative position of the printing medium M with respect to the printing unit 15, using the upstream side position detection sensor 71 and the downstream side position detection sensor 72.

The eye mark and the gap between the printing media M detected by the upstream side position detection sensor 71 and the detection unit 50 serve as a reference for setting the position (printing start position) at which the printing on the printing medium M starts.

Next, the detection unit 50 and the communication unit 60 of the present embodiment will be described.

Figure 2:
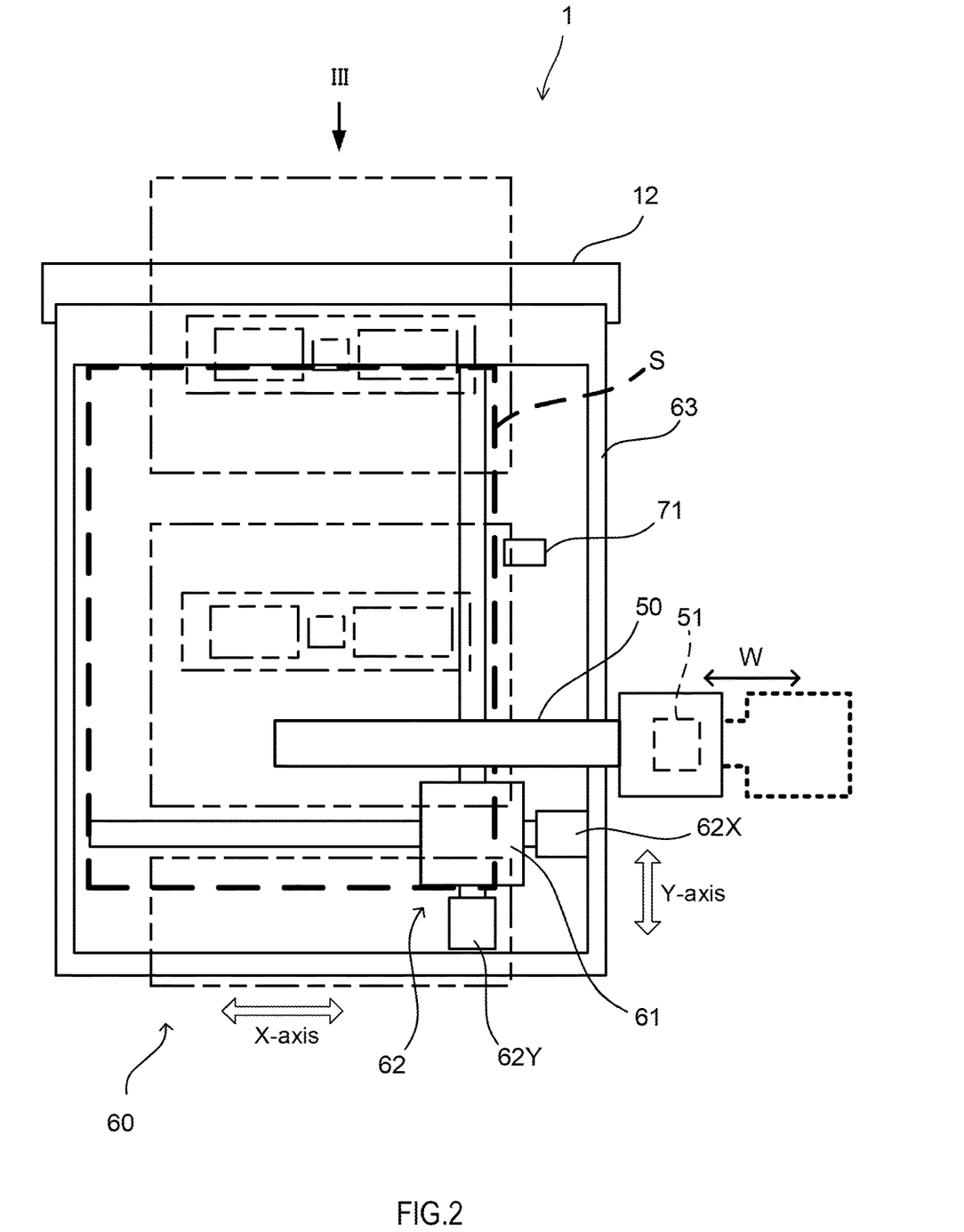
FIG. 2 is a schematic view illustrating a communication unit and a detection unit of the printer according to the first embodiment.
Figure 3:
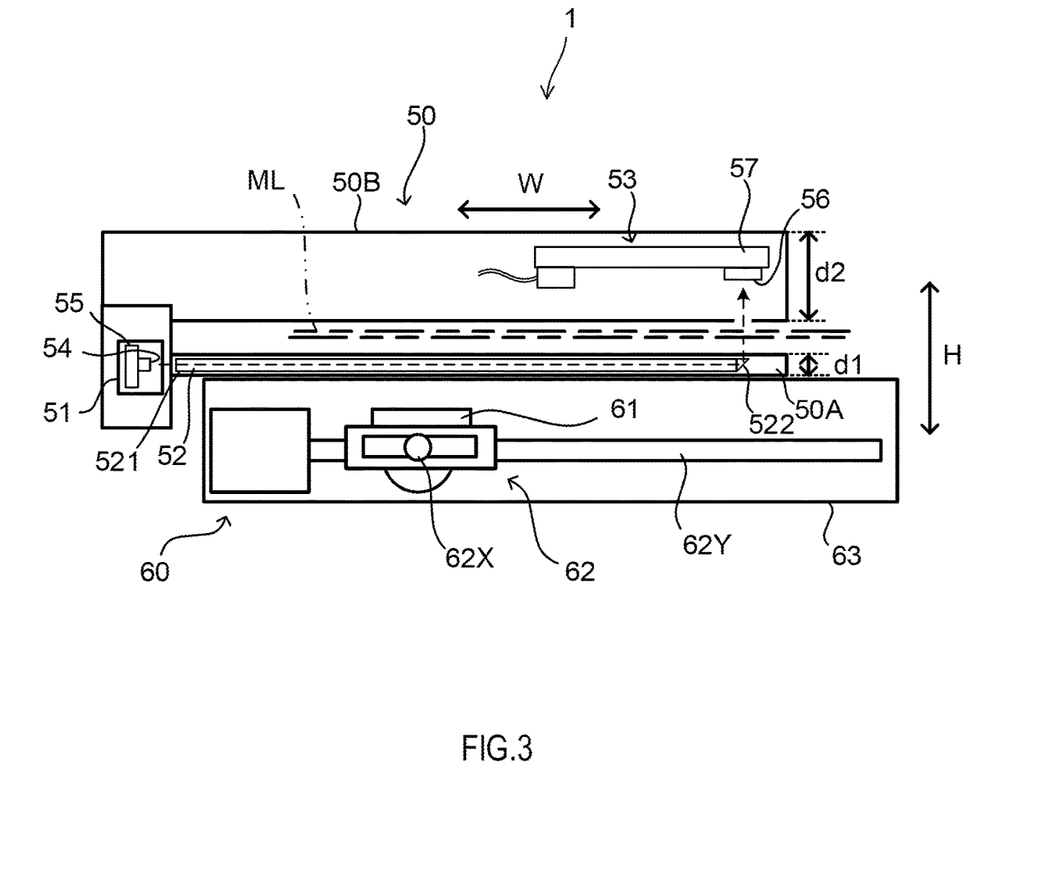
FIG. 3 is a side view as viewed in an arrow III illustrated in FIG. 2.

FIG. 2 is a plan view of the detection unit 50 and the communication unit 60 of the present embodiment. FIG. 3 is a side view as viewed in an arrow III in FIG. 2.

As illustrated in FIG. 3, the detection unit 50 includes a light emitter 51 that emits detection light for detecting the printing medium M, a light guiding member 52 that guides the detection light emitted from the light emitter 51 to the printing medium M, a light receiver 53 that receives the detection light through the printing medium M.

The detection unit 50 includes a lower side unit 50A and an upper side unit 50B. The lower side unit 50A is provided with the light emitter 51 and the light guiding member 52. The upper side unit 50B is provided with the light receiver 53. The detection unit 50 forms what is known as a transmissive photo electric sensor.

The light emitter 51 and the light guiding member 52 are arranged on one surface side of the printing medium M (continuous body ML), and the light receiver 53 is arranged on the other surface side. Thus, the detection unit 50 is arranged adjacent to the communication unit 60, with the continuous body ML sandwiched between the lower side unit 50A and the upper side unit 50B. In FIG. 2, the continuous body ML is indicated by a two dot chain line.

With the detection unit 50, the printer 1 can detect the gap between the printing media M based on a difference in light intensity between the detection light that has reached the light receiver 53 through the mount, and the detection light that has reached the light receiver 53 through the mount and the printing medium M.

The light emitter 51 is arranged outside the area S in which the communicator 61 is movable (see FIG. 2), in the width direction of the printing medium M (W direction in FIG. 2).

The light emitter 51 includes a light emitter substrate 55 provided with a light emitting element 54 emitting the detection light. The mounting surface of the light emitter substrate 55 is arranged to be orthogonal to the conveyance surface of the printing medium M and to be parallel to the conveyance direction of the printing medium M.

The light guiding member 52 is provided between the light receiver 53 and the communication unit 60 in the width direction of the printing medium M. The light guiding member 52 is provided at a position close to the communication unit 60.

The light guiding member 52 has one end portion 521 facing the light emitting element 54 and has the other end portion 522 inclined to change the traveling direction of the detection light, emitted from the light emitter 51, to a direction toward the light receiver 53.

Thus, in the present embodiment, the end portion 521 of the light guiding member 52 may be in a shape of a column with a cross section, orthogonal to the traveling direction of the detection light, shaped and sized to be capable of receiving the detection light. Specifically, the light guiding member 52 may have a rectangular parallelepiped or cylindrical shape. In the present embodiment, the end portion 522 positioned on the light receiver 53 side of the light guiding member 52 is inclined by 45° relative to the conveyance surface. Thus, the detection light guided to the light guiding member 52 from the light emitting element 54 can have the direction changed to the vertical direction by this inclined surface, to enter the light receiver 53.

The light receiver 53 includes a light receiver substrate 57 provided with a light receiving element 56 receiving the detection light, with the light receiving element 56 arranged to face the end portion 522 (emission port) of the light guiding member 52. With this configuration, the light receiver 53 can receive the detection light guided by the light guiding member 52 and transmitted through the continuous body ML.

The detection unit 50 is configured to be movable in the width direction of the printing medium M indicated by an arrow D in FIG. 2 and FIG. 3, without changing the positional relationship between the light receiving element 56 and the end portion 522 (emission port) of the light guiding member 52.

As described above, the lower side unit 50A of the detection unit 50 is configured in such a manner that the light emitter 51 is arranged outside the area S and the detection light from the light emitter 51 is guided by the light guiding member 52. Thus, as illustrated in FIG. 3, a thickness d1 of the lower side unit 50A in an H direction, orthogonal to the conveyance surface of the printing medium M, is smaller than a thickness d2 of the upper side unit 50B in the H direction.

Next, the communication unit 60 will be described. As illustrated in FIG. 2, in the communication unit 60, the upper surface of the cover 63, that is, the surface of the cover 63 facing the printing medium M forms a media guard.

In FIG. 2, the upper surface (media guard) of the cover 63 is illustrated to be partially notched for the sake of description. The upper surface (media guard) of the cover 63 may be detachably configured.

The moving mechanism 62 includes an X axis moving unit 62X and a Y axis moving unit 62Y formed by ball screws and the like provided respectively in the conveyance direction of the printing medium M (also referred to as "Y axis direction") and a direction orthogonal to the conveyance direction (also referred to as "X axis direction").

With this configuration, the communicator 61 can move in the area S with a rectangular shape, with the sides defined by the conveyance direction (Y axis direction) and the width direction (X axis direction) of the printing medium M.

The X axis moving unit 62X of the moving mechanism 62 is configured to be movable by 25 steps at 1 mm interval in the X axis direction, and the Y axis moving unit 62Y is configured to be movable by 29 steps at 1 mm interval in the Y axis direction, for example. Thus, the communicator 61 can move to each of the points forming a grid comprising 25×29 steps in the area S.

Here, as described above, in the printer 1 according to the present embodiment, the detection unit 50 includes the light guiding member 52 that guides the detection light emitted from the light emitter 51 to the printing medium M. Thus, the light emitter 51 can be arranged with a higher degree of freedom. The light emitter 51 can be arranged at a position not hindering the movement of the communication unit 60, whereby the area S in which the communication unit 60 moves can be arranged within a desired range.

As a result, the printer 1 according to the present embodiment can have the communication unit 60, with the communicator 61 being movable within the area S, arranged below and adjacent to the detection unit 50.

As described above, the thickness d1 of the lower side unit 50A is smaller than the thickness d2 of the upper side unit 50B. Thus, the communicator 61 can move in the area S in the X axis direction and the Y axis direction, without interfering with the detection unit 50. Furthermore, as illustrated in FIG. 2, even when the area S in which the communication unit 60 is movable is at a position overlapping with the lower side unit 50A of the detection unit 50, communications with the RFID can be established without being hindered.

As illustrated in FIG. 2, the upstream side position detection sensor 71 is provided more on the downstream side than the moving mechanism 62 in the conveyance direction, and is positioned so as not to hinder the communicator 61. The upstream side position detection sensor 71 is configured separately from the detection unit 50, so that the detection unit 50 can have a simple configuration.

In the continuous body ML, the position of the RFID 110 incorporated in the printing medium M slightly varies, due to a tolerable manufacturing error in the factory or a difference in the product specification. In view of this, the printer 1 according to the present embodiment has the communication unit 60 including the moving mechanism 62 so that the communicator 61 can move in the area S.

Thus, when the printing medium M includes the RFID 110, the position of the communicator 61 can be adjusted to correspond to the IC chip C of the RFID 110 in the area S, to achieve favorable communications with the IC chip C of the RFID 110.

<Effect>

According the printer 1, the detection unit 50 includes the light guiding member 52 that guides the detection light, emitted from the light emitter 51, to the printing medium M. Thus, the light emitter 51 can be arranged with a higher degree of freedom, and thus can be arranged at a position not hindering the movement of the communication unit 60. Thus, the area in which the communication unit 60 is movable can be secured, without the detection unit hindering the communications between the RFID 110 and the communication unit 60.

The light emitter 51 is arranged outside the area S in which the communicator 61 is movable in the width direction of the printing medium M. The detection light is configured to be guided by the light guiding member 52 extending over the printing medium M in the width direction, between the light receiver 53 and the communication unit 60. Thus, the thickness d1 of the lower side unit 50A of the detection unit 50 in the H direction can be made small. Thus, an even wider movable area can be secured for the communication unit 60.

The light emitter substrate 55 of the light emitter 51 is arranged to be orthogonal to the conveyance surface of the printing medium M, and with the emission direction of the detection light from the light emitting element 54 being parallel to the width direction of the printing medium M. Thus, the thickness d1 of the lower side unit 50A of the detection unit 50 in the H direction can be reduced, and the space saving in the width direction can be achieved compared with a case where the substrate plane of the light emitter substrate 55 is arranged in parallel with the conveyance surface in the width direction.

The light guiding member 52 may have the cross section, orthogonal to the traveling direction of the detection light, with any cross sectional shape shaped and sized to be capable of receiving the redetection light from the light emitting element 54. The end portion 522 facing the light receiver 53 is inclined to change the traveling direction of the detection light to a direction toward the light receiver 53. With such a light guiding member 52, the light guide path from the light emitter 51 can be easily designed in the lower side unit 50A.

The detection unit 50 is movable in the width direction of the printing medium M so that printing media M with different width sizes can be used.

The detection unit 50 has the thickness d1 of the lower side unit 50A being smaller than the thickness d2 of the upper side unit 50B. Thus, the area S in which the communication unit 60 is movable can be provided at a position below and adjacent to the lower side unit 50A.

The lower side unit 50A is not provided with the light emitter substrate 55 or the like, and thus the sensitivity of the communications by the communication unit 60, arranged in an overlapping manner in the vertical direction of the detection unit 50, with the RFID can be prevented from being compromised.

Second Embodiment

Figure 4:
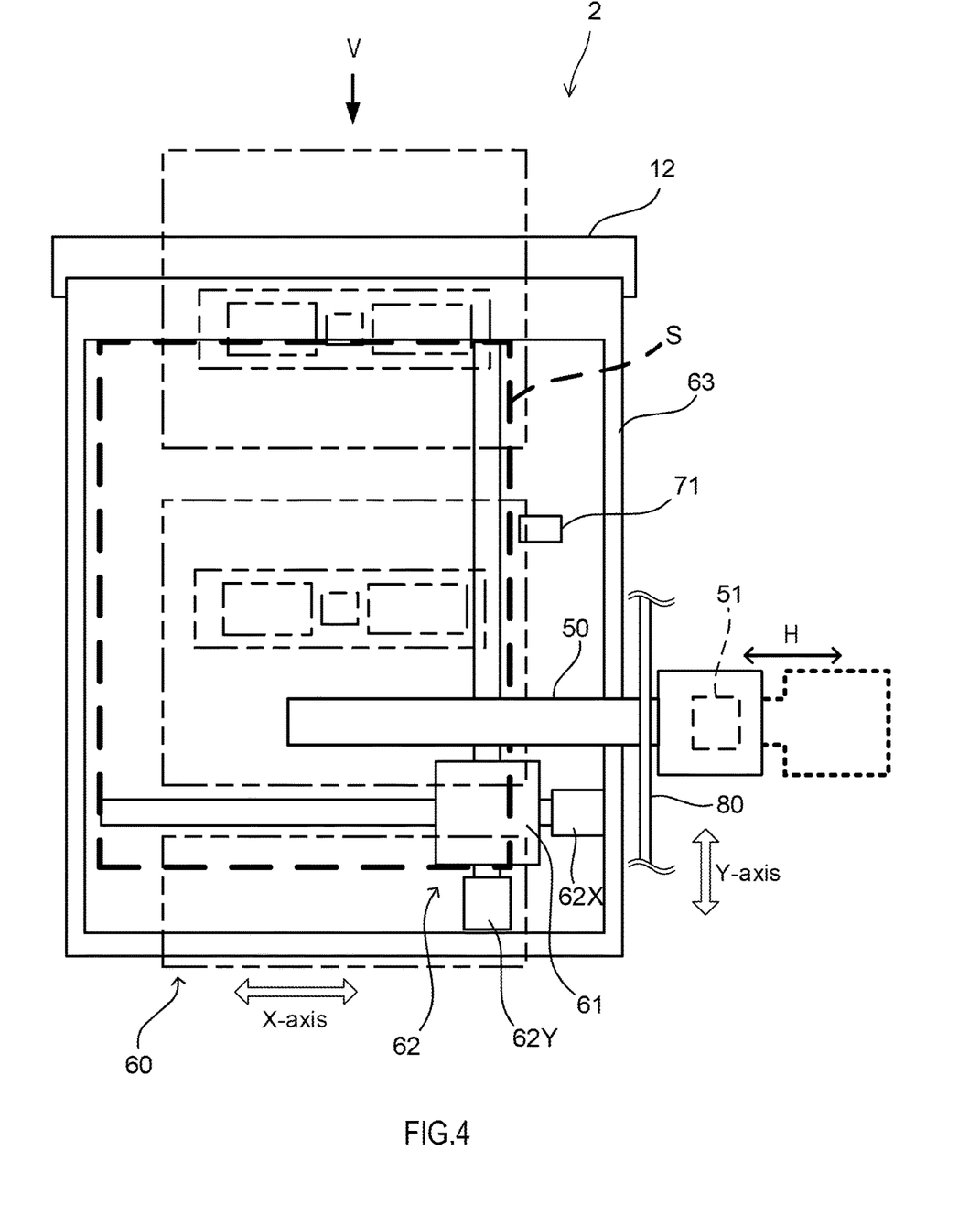
FIG. 4 is a schematic view illustrating a communication unit and a detection unit according to a second embodiment of the present invention.
Figure 5:
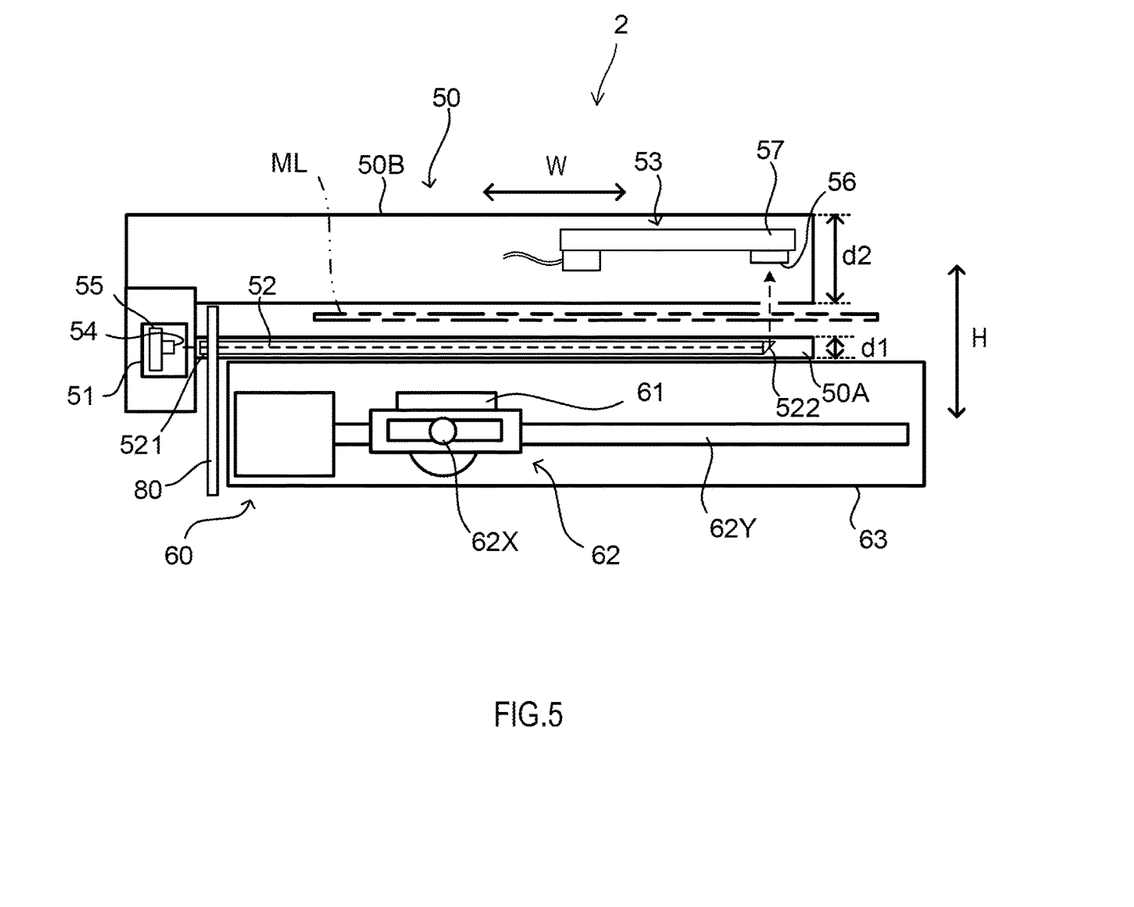
FIG. 5 is a side view as viewed in an arrow V in FIG. 4.

A printer 2 according to a second embodiment of the present invention will be described below with reference to the attached drawings. FIG. 4 is a plan view of a detection unit 50 and a communication unit 60 according to the printer 2. FIG. 5 is a side view as viewed in an arrow V in FIG. 4. In the printer 2 illustrated in FIG. 4 and FIG. 5, the components having the same functions as those in the printer 1 illustrated in FIG. 2 and FIG. 3 will be denoted by the same reference numerals and the detailed description thereof will be omitted.

The printer 2 further includes a frame 80 arranged outside a predetermined area S in the width direction W of the printing medium M.

The frame 80 is a member for shielding electromagnetic noise radiated from the light emitter substrate 55. In the present embodiment, the frame 80 is a part of the printer 2. The frame 80 may also serve as a supporting member that supports the upper side unit 50B from the communication unit 60 side.

The light emitter 51 is arranged outside the frame 80 in the width direction W of the printing medium M (see FIG. 4). The mounting surface of the light emitter substrate 55 is arranged to be orthogonal to the conveyance surface of the printing medium M and to be parallel to the conveyance direction of the printing medium M. The light guiding member 52 is inserted in a hole formed in the frame 80.

<Effect>

The printer 2 according to the second embodiment has the frame 80 so that the electromagnetic noise radiated from the light emitter substrate 55 can be shielded. Thus, the communication sensitivity of the RFID can be prevented from being compromised by the influence of the electromagnetic noise radiated from the light emitter substrate 55.

The frame 80 may be made of resin or may be made of metal. In the case of the metal, the electromagnetic noise can be more effectively shielded than in the case of resin.

[Adjustment Processing by Communication Unit]

In the printer 1 and the printer 2 described above, the communication unit 60 executes adjustment processing for position adjustment of the communicator 61 in the area S, to correspond to various shapes and sizes of the printing medium M and the position of the IC chip differing depending on the arranged position of the RFID 110 in the printing medium, and for adjusting the sensitivity of communications with the RFID 110.

Figure 6:
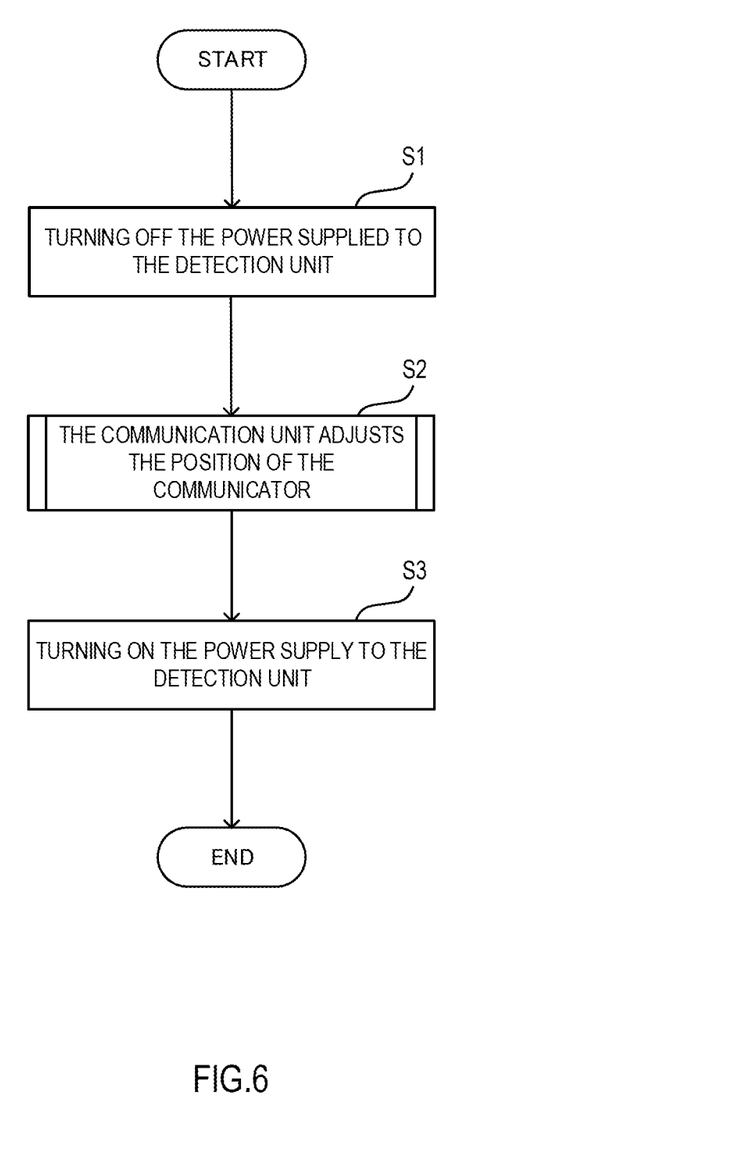
FIG. 6 is a flowchart illustrating adjustment processing executed by the communication unit of the printer according to the first embodiment and the printer according to the second embodiment.

FIG. 6 is a flowchart for describing the adjustment processing for the communication unit 60 executed in the printer 1 and the printer 2.

The communication unit 60 turns OFF the power supplied to the detection unit 50 in step S1 before the adjustment processing is executed.

Then, in step S2, the communication unit 60 adjusts the position of the communicator 61 in the area S, the communication radio wave output of the communicator 61 and the like, so that favorable communications with the RFID 110 incorporated in the printed medium M can be achieved.

When the adjustment processing ends, the communication unit 60 turns ON the power supply to the detection unit 50 in step S3.

As described above, in the printer 1 and the printer 2, when the communication unit 60 executes the adjustment processing, the power supply to the detection unit 50 is turned OFF, and thus the operation of the detection unit 50 stops.

Thus, no electromagnetic noise is generated from circuits of the light emitter substrate 55 mounted on the detection unit 50 and the like, when the communication unit 60 executes the adjustment processing.

Thus, the communication unit 60 can appropriately adjust the communication radio wave output, when adjusting the position of the communicator 61 in accordance with the type of the printing medium M, whereby the printing medium M (RFID 110) can be read more accurately.

OTHER EMBODIMENTS

Although the embodiments of the present invention have been described above, the embodiments are merely an example of application of the present invention, and the technical scope of the present invention is not intended to be limited to the specific configuration of the embodiments described above.

In the present embodiment, a label having a back surface provided with an adhesive enabling the label to be attached to a target object is described as an example of the printing medium M. However, this should not be construed in a limiting sense. The label may be fixed on a target object, such as a tag or a wrist band, using a fixing part.

The moving mechanism 62 may be a combination of a stepping motor and a ball screw and the like. The communicator 61 may be movable to any position on the printing medium M, by driving each of the stepping motors of the X axis moving unit 62X and the Y axis moving unit 62Y, based on an instruction from an unillustrated controller.

The cross section of the end portion 521 of the light guiding member 52, orthogonal to the traveling direction of the detection light, may be in any shape as long as the detection light from the light emitting element 54 can be received. Thus, the light guiding member 52 may be of a plate shape, in addition to the rectangular parallelepiped and cylindrical shapes.

In the present embodiment, a case where the light guiding member 52 is applied to the light emitter 51 is described. In addition, the light guiding member may also be applied to the light receiver 53. In this case, the light receiver substrate 57 provided with the light receiving element 56 is arranged outside the region facing the area S, in the width direction (the W direction in FIG. 2) of the printing medium M, and the light guiding member for light reception is arranged over a section from the position facing the end portion 522 of the light guiding member 52 on the light emission side to the light receiving element 56. With this configuration, the upper side unit 50B can have a small thickness d2.

In the present embodiment, the adjustment processing may be adjusting only the position of the communicator 61 in the area S or may be adjusting only the radio wave output. Furthermore, other parameters affecting the communication sensitivity may be adjusted.

The present application claims a priority of Japanese Patent Application No. 2019-121975 filed with the Japan Patent Office on Jun. 28, 2019, and Japanese Patent Application No. 2020-106334 filed with the Japan Patent Office on Jun. 19, 2020 and all the contents of which are hereby incorporated by reference.

The invention claimed is:

1. A printer configured to perform printing on a printing medium having an RFID, the printer comprising:
   a communication unit that includes a communicator provided to be movable in a predetermined area along a conveyance surface of the printing medium, and is configured to communicate with an IC chip of the RFID; and
   a detection unit configured to detect the printing medium using detection light, wherein:
   the detection unit includes:
     a light emitter configured to emit the detection light;
     a light guiding member configured to guide the detection light, emitted from the light emitter, to the printing medium; and
     a light receiver configured to receive the detection light through the printing medium,
   wherein the light guiding member is provided between the light receiver and the communication unit, and is provided at a position in a vicinity of the communication unit.

2. The printer according to claim 1, wherein the light emitter and the light guiding member are provided to face one surface side of the printing medium, and the light receiver is provided to face another surface side.

3. The printer according to claim 1, wherein
   the predetermined area is formed in a rectangular shape with sides defined by a conveyance direction and a width direction of the printing medium, and
   the communicator is movable in the conveyance direction and in the width direction of the printing medium.

4. The printer according to claim 1, wherein the light guiding member is provided along the width direction of the printing medium.

5. The printer according to claim 1, wherein the light emitter is arranged outside the predetermined area in the width direction of the printing medium.

6. The printer according to claim 1, wherein:
   the light emitter includes a light emitter substrate provided with a light emitting element configured to emit the detection light, and
   a mounting surface of the light emitter substrate is arranged to be orthogonal to the conveyance surface and to be parallel to the conveyance direction of the printing medium.

7. The printer according to claim 6, wherein the light guiding member has one end portion facing the light emitting element and another end portion inclined to change a traveling direction of the detection light, emitted from the light emitter, to a direction toward the light receiver.

8. The printer according to claim 1 further comprising:
   a frame arranged outside the predetermined area in the width direction of the printing medium, wherein
   the light emitter is arranged outside the frame in the width direction of the printing medium.

9. The printer according to claim 1, wherein the light guiding member is movable in the width direction of the printing medium.

10. The printer according to claim 1, wherein:
    the detection unit includes:
      a lower side unit provided with the light emitter and the light guiding member; and
      an upper side unit provided with the light receiver, and
    a thickness of a portion of the lower side unit provided with the light guiding member is smaller than a thickness of the upper side unit.

11. The printer according to claim 1, wherein the communication unit is configured to execute adjustment processing with power supply to the detection unit turned OFF.

12. The printer according to claim 1, wherein the communication unit is arranged below and adjacent to the light guiding member.

* * * * *